United States Patent [19]

Sims

[11] Patent Number: 4,471,941

[45] Date of Patent: Sep. 18, 1984

[54] HYDRAULIC VALVE

[76] Inventor: James O. Sims, Rte. 2, Box 240, Hartselle, Ala. 35640

[21] Appl. No.: 433,777

[22] Filed: Feb. 11, 1983

[51] Int. Cl.³ .......................................... F16K 31/22
[52] U.S. Cl. ....................................... 251/63; 251/31
[58] Field of Search ........................... 251/31, 62, 63;
137/219

[56] References Cited

FOREIGN PATENT DOCUMENTS 1260099 3/1961 France ................................. 251/63

Primary Examiner—Carroll B. Dority, Jr.
Attorney, Agent, or Firm—C. A. Phillips

[57] ABSTRACT

A hydraulically operated valve which is operated open and closed by applying differential pressure to opposite end surfaces of an annular piston which moves a concentrically positioned valve operating plunger.

6 Claims, 3 Drawing Figures

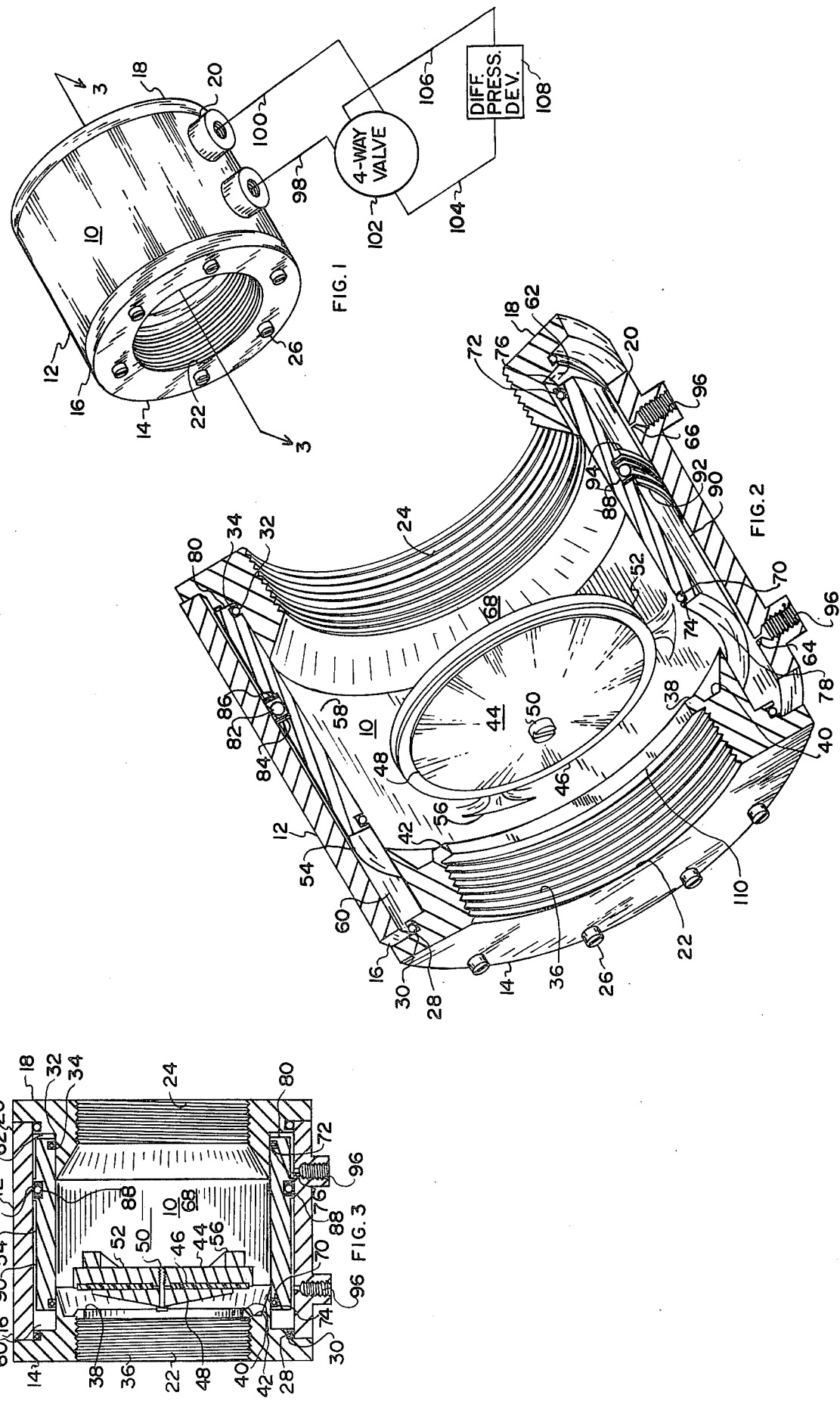

HYDRAULIC VALVE

TECHNICAL FIELD

This invention relates to valves which are opened and closed by hydraulic pressure.

BACKGROUND OF THE INVENTION

There exist valves which are adapted to be hydraulically operated. In examining the prior art with respect to them, one such type valve appears. In it, a pair of spaced annular pistons are connected together by a tubular sleeve, and a sealing shoulder is positioned around this tubular sleeve between the annular pistons. By this combination, two expansion-contraction chambers are formed. A valve plunger is positioned on the end of the tubular sleeve, and fluid flow, normally being through the center of the sleeve, is blocked or unblocked by the valve action of the plunger. Since the pistons are at opposite ends of the assembly and the chambers intermediate them, inherently, the whole structure is lengthy and not adaptable to construction for employment in confined spaces.

It is an object of this invention to provide an improved hydraulically operated valve which is extremely compact and thus positionable in restricted spaces, and at the same time is of simpler construction than valves of the type described and less costly to manufacture and supply to users.

SUMMARY OF THE INVENTION

In accordance with this invention, an outer housing having a pair of spaced orifices therein is generally enclosed by a pair of oppositely positioned end walls. Each end wall includes an opening therethrough for passing in-line fluid flow into and out of the valve, and each end wall also has an annular guide ring extending longitudinally back into the housing and defining an annular space at opposite end regions of the outer housing. A piston whose end regions are also annular is positioned within these annular spaces, thereby defining oppositely positioned annular cavities. The valve is operated by applying a differential fluid pressure between the orifices which are coupled to the annular cavities. This pressure differential then appears on opposite ends of the annular piston, and thereby the pisron is moved back and forth within the valve. A valve mating surface attached to the interior of the piston is moved back and forth with the piston, thereby making and/or breaking sealing engagement with a fixed valve mating surface secured to one of the end walls.

BRIEF DESCRIPTION OF THE DRAWINGS

FIG. 1 is a pictorial view of an in-line valve, illustrating in diagrammatic fashion the external means necessary for operating the valve.

FIG. 2 is a pictorial view, partially in section and partially cut away, of an embodiment of the invention.

FIG. 3 is a longitudinal sectional view taken along line 3—3 of FIG. 1.

DETAILED DESCRIPTION OF THE INVENTION

Referring to FIGS. 1-3, a hydraulically operated valve 10 is constructed to be enclosed by a cylinder 12, annular end member 14 attached to end 16 of cylinder 12, and annular end member 18 attached to opposite end 20 of cylinder 12. End members 14 and 18 have threaded openings 22 and 24 and are thereby adapted to connect to a fluid line. End member 14 attaches via screws 26 into end 16 of cylinder 12, and a fluid seal between the two is effected by a resilient "O" ring 28 positioned in a groove 30 around end member 14. Similarly, end member 18 is attached by screws 26 (not shown) to end 20 of cylinder 12, and a sealing engagement between the two is effected by a resilient "O" ring 32 in a groove 34 around end member 18.

Valve operation is effected by the opening and closing of opening 22 in end member 14. To facilitate this, a valve mating surface 38 is formed in an interior wall 40 of end member 14 to provide a valve engaging face or seat 42. Compactness is achieved by forming valve seat 42 quite close to the end of threads 36.

Closing of valve 10 is effected by a centrally positioned and longitudinally moving plunger 44 which has a circular resilient valve closing member 46 which, when plunger 44 is moved to the left, will engage valve seat 42 and thereby close the valve. Resilient member 46 is typically formed of a round piece of neoprene or other similar material and is held in place by a plate 48, in turn secured by a screw 50 extending into base member 52 of plunger 44.

Plunger 44 is supported on and operated by a tubular piston 54, support being by means of web-like supports 56 attaching between base member 52 and an interior surface 58 of piston 54. In the illustration shown, web supports 56 are positioned at 90° intervals about plunger 44, two of them being shown. Plunger 44 is positioned with resilient valve closing member 46 off center in piston 54 in the direction of valve seat 42 to enable maximum opening movement of piston 54 when the valve is in an open state.

Piston 54 is sized to move longitudinally within cavities 60 and 62 formed between the outer surface of annular end members 14 and 18, and piston 54 is moved by the application of hydraulic fluid pressure to these cavities, this being effected through orifices 64 and 66 in the wall of cylinder 12. A seal between the interior 68 of valve 10 is effected by sealing rings 70 and 72 positioned in grooves 74 and 76 near the extreme walls 78 and 80 of piston 54. Thus, these sealing rings engage the outer annular surface of end members 14 and 18. The cavity-to-cavity sealing between cavities 60 and 62 is effected by circular resilient sealing ring 82 and rectangular shoulder rings 84 and 86 in groove 88 in the outer side 90 of piston 54, this groove and its sealing members being positioned off center, that is, closer to wall 80 than to wall 78, this being proportional to the distance between the plane of sealing of resilient sealing member 46 and the opposite wall 78 of piston 54 so that, as discussed above, the maximum opening state for the valve may be achieved in an extremely limited overall length for the valve.

Piston 54 also incorporates a pair of guide rings 92 and 94 which center piston 54 within valve 10, whereby annular cavities 60 and 62 are effected on either side of sealing members 82, 84, and 86. Thus, it is insured that there will be a passageway from each orifice to cavities 60 and 62 when piston 54 actually is opposite one of the orifices, as is shown with respect to orifice 66.

Orifices 64 and 66 have threaded regions 96 for coupling control lines as illustrated schematically by lines 98 and 100. These lines connect to a four-way valve 102, which in turn is supplied, via lines 104 and 106, a differential fluid pressure, such as provided by differential pressure device or source 108. Thus, in operation, four-way valve 102 would be operated to apply a pressure to one of lines 98 or 100 and no pressure, or a return state, to the other line. In order to close valve 10, four-way valve 102 would be operated to apply high pressure to line 100 and a return condition to line 98, whereby there is fluid flow in through orifice 66, to the right along piston 54 to cavity 62. At the same time, fluid from cavity 60 is permitted to flow outward through orifice 64 and line 98. As a result, piston 54 would be moved to the left by the pressure in cavity 62 applying a force to wall 80 of piston 54. This causes plunger 44 to be moved in this direction until the surface of resilient member 46 presses against valve seat 42, closing the valve. Opening of the valve would be effected by operating four-way valve 102 oppositely, whereby a pressure state is moved through line 98 and the return state through line 100. In this case, fluid would enter cavity 60 through orifice 64 and pressurized cavity 60 which would apply a pressure on wall 78 of piston 54. At the same time, fluid in the opposite cavity 62 would flow outward through return line 100. This combination then causes piston 54 to move to the right and thereby move resilient member 46 on plunger 44 out of contact with valve seat 42, opening the valve. Fluid flow through the valve would then be enabled through valve 10, flowing inward through one of openings 22 and 24 and flowing outward through the other of them, flow being between piston 54, web members 56 and plunger 44, and through the now-opened region around valve seat 42.

The length of valve 10 has been reduced by forming valve seat 42 adjacent to threads 36 and by recessing interior wall 40 within end member 14 a distance making wall 40 only slightly offset from back wall 110 of valve seat 42. By this configuration, it is only necessary to have sufficient cross section of material on which valve seat 42 is mounted to withstand the closing forces applied to it.

From the foregoing, it is to be appreciated that there has been provided an improved hydraulically operated valve. Its operation is positive, there is clearly no chance of a binding in the hydraulically operated member, and the length of the valve has been minimized, enabling it to be employed in quite restricted spaces.

I claim:

1. A hydraulically operated valve comprising:
   a cylindrical housing having first and second coaxial openings at opposite ends;
   a first annular ring positioned just interior of one end of said housing, and a second annular ring positioned just interior of the other end of said housing, and there being formed thereby a first annular cavity between said first annular end ring and housing, and a second annular cavity between said second annular ring and said housing;
   an annular valve seat positioned on said first end ring and around said first opening;
   a generally cylindrically configured valve operating member positioned within said cavities and comprising:
   a valve plunger having a circular face region configured to engage said valve seat and effect a closure of said first opening,
   an outer cylindrical-shaped piston region and angularly spaced web members interconnecting said valve plunger to said piston region, there being passageways for fluid flow through the valve between said valve plunger, said piston region, and said web members, and
   said cylindrical-shaped piston having a first annular end region adapted to slidably move within said first annular cavity, and a second annular end region adapted to slidably move within said second annular cavity;
   a first fluid passageway extending through said housing to said first cavity, and a second fluid passageway extending through said housing to said second cavity; and
   a sealing ring groove extending around the outer side of said piston in a mid region between said end regions of said piston region and a resilient sealing ring positioned in said groove and effecting sealable engagement between said piston and an inner wall of said housing.

2. A hydraulically operated valve as set forth in claim 1 wherein said piston includes a first enlarging ring around said piston region adjacent to, on one side of, said groove, and a second enlarging ring adjacent to, on the other side of, said groove, whereby an annular clearance is provided between said piston and the inner side of said housing from each said ring to said annular cavities.

3. A hydraulically operated valve as set forth in claim 2 wherein said valve seat is longitudinally positioned directly interior of said first annular cavity on an inner side of said first end ring.

4. A hydraulically operated valve as set forth in claim 3 wherein said first annular ring includes a grooved region around the outer periphery of said annular valve seat, whereby said valve seat effects a standoff position.

5. A hydraulically operated valve as set forth in claim 3 wherein said sealing ring groove is positioned longitudinally off center, closer to said second annular end region of said piston region than to said first annular end region of said piston region, and said circular face configured to engage said valve seat is positioned closer to said first annular region than to said second annular region of said piston.

6. A hydraulically operated valve as set forth in claim 5 wherein said first annular ring is detachable from and forms a first annular end wall of said housing and includes a first piston-to-annular ring sealing means, in turn comprising a groove and first sealing ring combination positioned in an interior surface of said first annular end region of said piston and effecting a seal with said first annular ring, and said second annular ring is detachable from and forms a second annular end wall of said housing and includes a second piston-to-annular ring sealing means, in turn comprising a groove end resilient sealing ring combination positioned in an interior surface of said second annular end region of said piston and effecting a seal with said second annular ring.

* * * * *